Patented Jan. 12, 1943

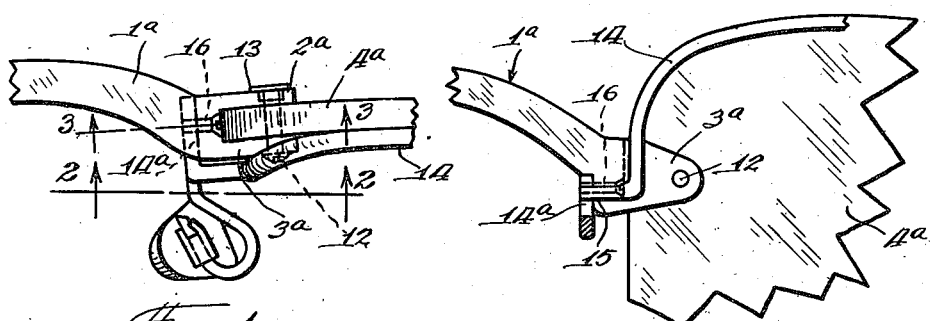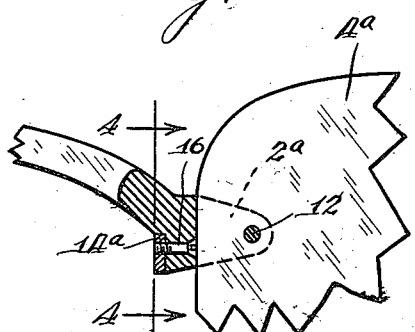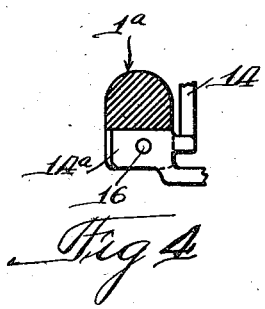

2,308,253

UNITED STATES PATENT OFFICE 2,308,253

OPHTHALMIC MOUNTING

William R. Uhlemann, Evanston, and Richard H. Uhlemann, Antioch, Ill., assignors to Uhlemann Optical Co., Chicago, Ill., a corporation of Delaware Application April 22, 1939, Serial No. 269,450

4 Claims. (Cl. 88—41)

This invention relates to eyeglass and spectacle construction wherein certain basic elements are integrally formed of translucent plastic material.

An object of our invention is to provide an ophthalmic mounting made up of readily interchangeable detachable units which will require a relatively small number of bridges and units being kept in stock and yet will enable the optician to make a large number of combinations to take care of different spacing of focal centers, differences in features of the wearers, and different styles of mountings.

A further object of the invention is to provide a spectacle bridge or arch of translucent plastic material wherein suitable means is provided for supporting the lens and also wherein a simple and convenient structure is provided including temple supporting wires and their supporting means. The "temple supporting wire" as used herein is intended to mean a wire-like extension which, in the embodiment illustrated, is secured to the bridge and extends outwardly adjacent the edge of the lens, the free outer end of the wire being provided with a hinge portion for supporting the usual temple. A similar temple supporting wire construction is disclosed in the prior application of William R. Uhlemann, Serial No. 197,113, filed March 21, 1938 (Patent No. 2,188,380, issued January 30, 1940).

A further object of the invention is to provide an eyeglass or a spectacle structure which is cheap to manufacture, easy to assemble, and will not easily get out of order in use.

Further objects will be apparent from the specification and the appended claims.

Fig. 1 is a fragmentary top view of a spectacle structure illustrating an embodiment of the invention.

Fig. 2 is a rear elevation of the embodiment illustrated in Fig. 1 with the nose pad supporting arm in section on a line substantially corresponding to line 2—2 of Fig. 1.

Fig. 3 is a detail sectional view taken on a line substantialy corresponding to line 3—3 of Fig. 1.

Fig. 4 is a sectional view through the bridge and taken on a line substantially corresponding to line 4—4 of Fig. 3.

In the construction shown the bridge 1a is made of translucent plastic material and is provided with integral lugs or ears 2a and 3a to provide a slot therebetween to receive the lens 4a. The lens is clamped between the ears by means of a screw 12 which may be threaded into a bushing 13 inserted in the opening in the ear 2a or may be threaded directly into the bridge itself.

A temple supporting wire 14 is secured adjacent each end of the bridge 1a to a transverse base or lug portion 14a which is clamped against a surface 15 of the bridge and opposite the bottom wall of the slot between the ears 2a and 3a. The member 14 is secured in position by means of a screw 16 threaded into the lug 14a, the screw head being accessible in the slot between the lens supporting ears when the lens is removed.

Modifications may be made without departing from the spirit of the invention, and it is therefore desired that the invention be limited only by the scope of the appended claims.

Having thus described this invention, what is claimed and desired to be secured by Letters Patent is:

1. An ophthalmic mounting comprising a member of molded plastic material comprising a bridge portion and lens strap ears integral with said bridge portion for embracing the edge portion of a lens, a temple-supporting wire extending in the rear of along and adjacent the upper peripheral edge of the lens, and means for securing said wire to said plastic member comprising an anchorage member outside said plastic member to which said wire is secured and a fastener extending into registering openings in said anchorage member and plastic member, said fastener extending in a direction parallel to the plane of the lenses and lying beyond the confines of the lens and at least partly between the planes tangent to the outer faces of said strap ears.

2. An ophthalmic mounting comprising a member of molded plastic material comprising a bridge portion and lens strap ears integral with said bridge portion for embracing the edge portion of a lens, a temple-supporting wire extending in the rear of along and adjacent the upper peripheral edge of the lens, and means for securing said wire to said plastic member comprising an anchorage member outside said plastic member to which said wire is secured and a fastener extending into registering openings in said anchorage member and plastic member, said fastener extending in a direction parallel to the plane of the lenses and lying beyond the confines of the lens and at least partly between the planes tangent to the outer faces of said strap ears and said plastic member having a shoulder lying between said planes and engaged by said anchorage member.

3. An ophthalmic mounting comprising a member of molded plastic material comprising a bridge portion and lens strap ears integral with said bridge portion for embracing the edge portion of a lens, a temple-supporting wire extending in the rear of along and adjacent the upper peripheral edge of the lens, and means for securing said wire to said plastic member comprising an anchorage member outside said plastic member to which said wire is secured and a fastener extending into registering openings in said anchorage member and plastic member, said fastener extending in a direction parallel to the plane of the lenses and lying beyond the confines of the lens and at least partly between the planes tangent to the outer faces of said strap ears and said anchorage member in general lying beyond the peripheral edge of said lens.

4. An ophthalmic mounting comprising a member of molded translucent plastic material comprising a bridge portion and lens strap ears integral with said bridge portion for embracing the edge portion of a lens, a temple-supporting wire extending in the rear of along and adjacent the upper peripheral edge of the lens, and means for securing said wire to said plastic member comprising an anchorage member outside said plastic member to which said wire is secured and a fastener extending into registering openings in said anchorage member and plastic member, said fastener extending in a direction parallel to the plane of the lenses and lying beyond the confines of the lens and at least partly between the planes tangent to the outer faces of said strap ears.

WILLIAM R. UHLEMANN.
RICHARD H. UHLEMANN.